Dec. 12, 1944.  H. J. SEAMAN  2,364,667
ROTARY TILLING IMPLEMENT
Filed March 16, 1942  2 Sheets-Sheet 1

INVENTOR
HARRY J SEAMAN
BY Christopher L. Waal
ATTORNEY

Dec. 12, 1944.   H. J. SEAMAN   2,364,667
ROTARY TILLING IMPLEMENT
Filed March 16, 1942   2 Sheets-Sheet 2
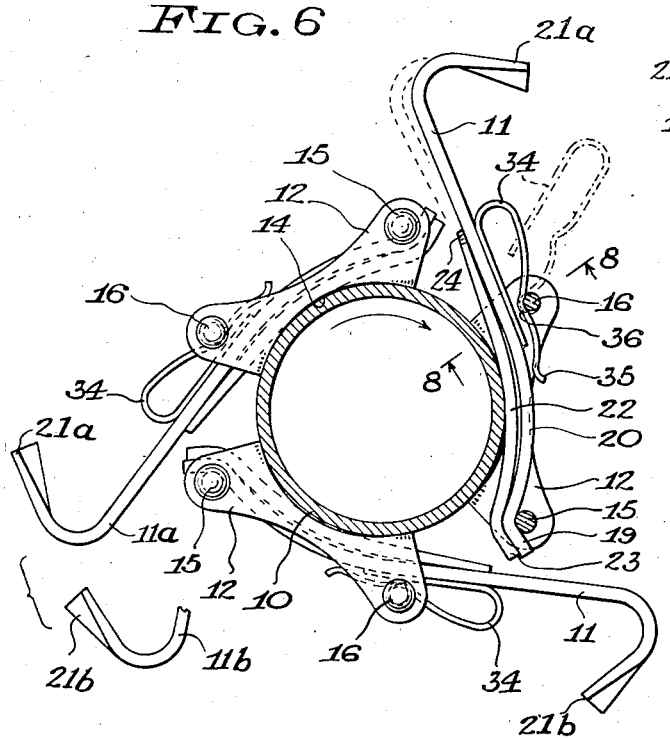
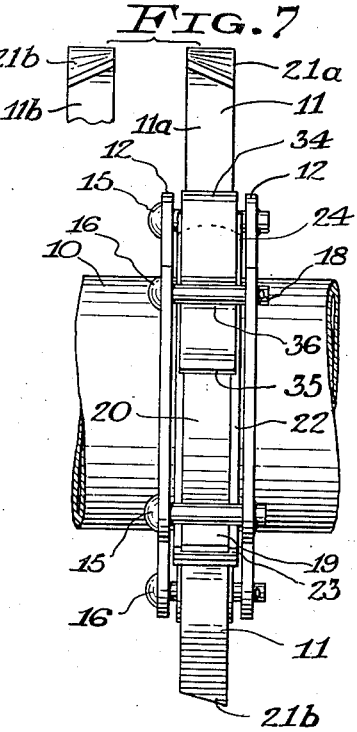
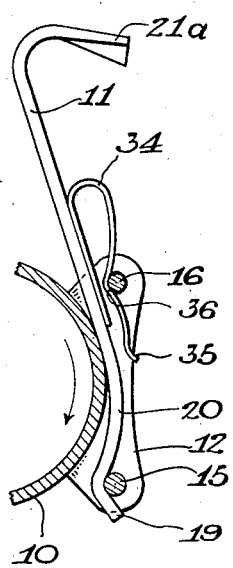
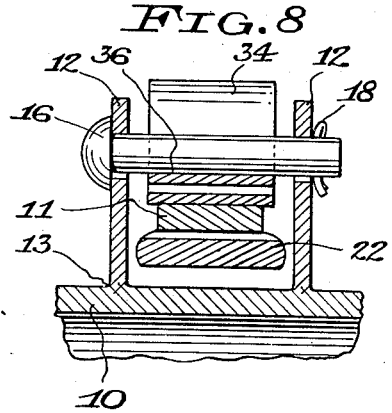
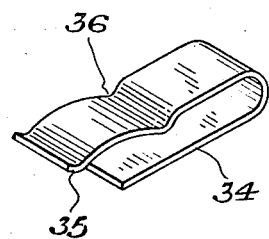
INVENTOR
HARRY J. SEAMAN
BY Christopher L. Naal
ATTORNEY Patented Dec. 12, 1944

2,364,667

UNITED STATES PATENT OFFICE 2,364,667

ROTARY TILLING IMPLEMENT

Harry J. Seaman, Milwaukee, Wis.

Application March 16, 1942, Serial No. 434,860

13 Claims. (Cl. 97—216)

The present invention relates to rotary tilling implements adapted for pulverizing, digging, mixing and otherwise working various materials, as in soil cultivation and road building.

An object of the invention is to provide a rotary tiller having improved means for resiliently mounting a tool thereon and for facilitating the application and removal of the tool.

Another object is to provide a rotary tiller which is of simple and rugged construction, requiring but relatively few parts, and which is capable of inexpensive manufacture.

A further object is to perfect details of construction and to provide tools having an efficient mixing action.

The invention further consists in the several features hereinafter described and claimed.

In the accompanying drawings, illustrating certain embodiments of the invention, Fig. 1 is a transverse sectional elevation of one form of rotary tiller, a deflected position of one of the tools being shown in broken lines.

Fig. 6 is a transverse sectional elevation of another modified form of rotary tiller, a deflected position of one of the tools being shown in dotted lines and an entering position of a detachable tool retainer being shown in broken lines;

Fig. 7 is a side elevation of the device of Fig. 6;

Fig. 8 is a detail sectional view taken generally along the line 8—8 of Fig. 6;

Fig. 9 is a perspective view of one of the tool retainers, and

Fig. 10 is a transverse sectional view of a further modified form of rotary tiller.

Figure 1:
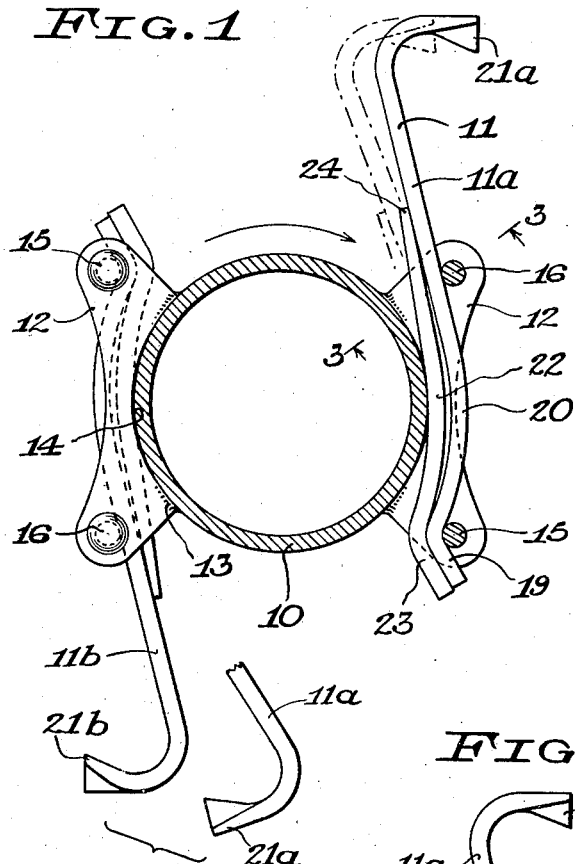
Figure 2:
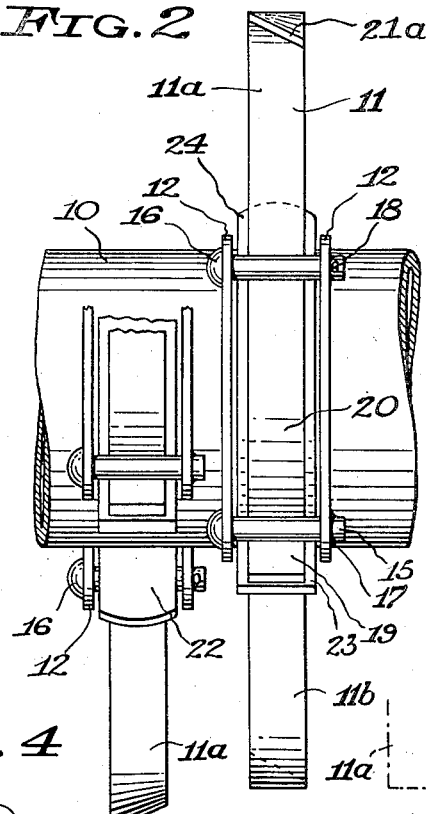
Fig. 2 is a side elevation.
Figure 3:
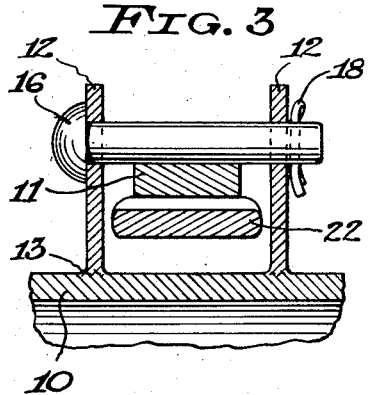
Fig. 3 is a detail sectional view taken generally along the line 3—3 of Fig. 1.

Referring to Figs. 1 to 3 of the drawings, 10 designates a rotary tiller shaft which is supported and driven in any suitable manner, the shaft being usually arranged in an approximately horizontal position and being movable over the soil or other material to be worked. The shaft, which is preferably in the form of a metal tube or pipe, has detachably mounted thereon one or more tines or tools 11 hereinafter more fully described, two diametrically opposite tools being shown in the present instance and being designated by 11a and 11b.

The shaft carries thereon two diametrically opposite pairs of flat apertured plates 12 which are rigidly secured to the shaft, as by welding 13, and which form eared flanges projecting outwardly from the periphery of the shaft at right angles to the shaft axis, each plate having a concave edge 14 which fits about the shaft. The plates in each pair are arranged in spaced parallel relation and near their opposite ear-forming ends are connected by headed pins 15 and 16 which are parallel to the shaft axis and are spaced outwardly from the periphery of the shaft, the pins extending through the plates. The pin 15 is secured to one or both of the plates 12, as by welding 17, while the pin 16 is detachable and is retained in place by a cotter pin 18. The pins 15 and 16 form abutments for the tools 11, as hereinafter described.

Each tilling tool or tine 11 comprises a flat, resilient metal bar which extends in a generally tangential direction with respect to the shaft. The tool has a bent end portion or open knuckle 19, the concave groove-forming side of which faces outwardly and bears against the inner side of the pin 15 to resist longitudinal displacement of the tool. At an intermediate point, say about midway of its length, the tool bears against the inner side of the pin 16 which forms a stop member or abutment. The tool has an arched portion 20 which extends between the pins 15 and 16. The free end portion of each tool forms a soil-working tip and in the present instance is shown in the form of a hook pointing in the direction of rotation. The tool tip or hook is twisted as seen in Fig. 2. The tool is locked or anchored in position by an arched spring bar or plate 22 which is interposed between the tool and the periphery of the shaft and which in effect forms a part of the tool. The spring plate 22 bears at its ends against the tool and bears at an intermediate point against the periphery of the shaft. At one end the spring plate has a knuckle 23 which fits against the similar knuckle 19 formed on the tool and thus presses the tool knuckle outwardly against the pin 15 and prevents longitudinal shifting of the tool and spring plate. The other end portion 24 of the spring plate is tapered and bears against the tool at a point beyond the stop pin 16. As seen in Fig. 1, the arched portion 20 of the tool is spaced from the arched spring plate in the region between the pins 15 and 16, thus permitting the tool to pivot on the pin 15 when the tool is deflected under load. The pivot pin 15 is offset a substantial distance in the direction of rotation from a radial line extending from the shaft axis to the outer end of the tool.

When the tool and spring plate are to be installed their knuckled ends are inserted under the pivot pin 15, the stop pin 16 being then absent. By a suitable bending device the tool and spring plate are deflected toward the shaft a sufficient distance to permit the insertion of the stop pin 16, whereupon the deflecting pressure on the tool is released, permitting the tool to spring outwardly against the stop pin under urge of the spring plate. In this position the tool is under stress, or preloaded, and is held firmly against the pins 15 and 16 by the spring plate. The cotter pin 18 is then applied to retain the stop pin. The flange plates 12 and the cross pins 15 and 16 form, in effect, a pair of loops or stirrups to receive the tool.

The soil working hooks of the tools 11a and 11b are designated by 21a and 21b, respectively, and each hook is of chisel-like or blade-like shape and is twisted to an angular position to effect a lateral displacement or throwing of the soil, the two hooks being of opposite hand so as to throw the soil first in one lateral direction and then in the other. The tiller shaft carries a series of the tools 11 in axially spaced relation, the laterally adjacent tools being angularly spaced as seen in Figs. 1 and 2 and being of opposite hand, that is, a tool 11a is laterally adjacent a tool 11b.

In operation, the tiller shaft is rotated at a suitable speed, causing the hooked tools or tines to enter and pulverize the soil or other material being worked. In some instances the tiller will also have a mixing action. Under light or medium loads each tool will remain in engagement with its stop pin 16, the outer portion of the resilient tool having some degree of deflection. Under heavy loads, the tool deflects inwardly as a whole against the pressure of the tapered spring plate 22, the knuckled end of the tool pivoting on the pin 15. This inward deflection occurs when the tiller encounters substantial resistance in its passage through the soil or other material being worked, as when striking a stone or other obstruction, thus reducing the effective radius of the tool and easing the stress on the tool so as to prevent breakage of the tool. The yielding of the tool also reduces the stresses on other parts of the mechanism. There is no tendency to develop play or looseness between the tool knuckle 19 and pivot pin 15 as both the spring pressure of the spring plate and the working pressure on the tool during operation are exerted outwardly against the pivot pin. The action of the twisted hooked ends of the tools is to throw or whip the soil or other material laterally, first in one direction and then in the other, so as to thoroughly work the material in the space between the paths of the tools as well as directly in these paths and to obtain an intimate mixing of the material. This action is particularly advantageous in mixing road building materials, as in soil stabilization and in constructing soil-cement and bituminous surfacings.

When a tool is to be removed from the shaft, it is only necessary to deflect the tool inwardly by a suitable bending device and to drive out the stop pin 16, whereupon the tool and spring plate are readily released from the pivot pin 15.

Figure 4:
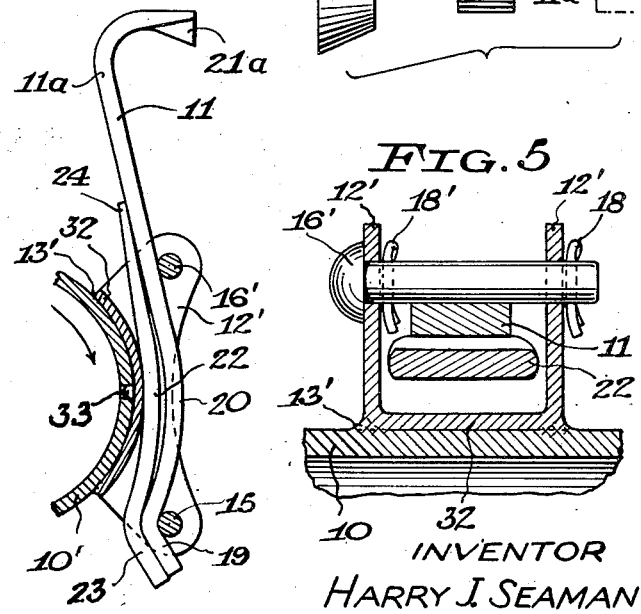
Fig. 4 is a transverse sectional elevation of a modified form of rotary tiller.
Figure 5:
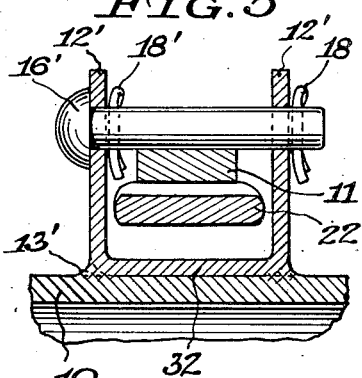
Fig. 5 is a sectional view similar to Fig. 3, but showing the device of Fig. 4.

In the modified form of rotary tiller shown in Figs. 4 and 5, the tool 11 bears against a pivot pin 15 and stop pin 16' which are carried by the spaced parallel flanges 12' of a channel member 32. The web of the channel member is curved to fit about the shaft 10' and is rigidly secured to the shaft, as by welding 13'. The spring plate 22 bears against the web of the channel member. The channel member is preferably pressed from a metal plate. If desired, a dowel connection 33, Fig. 4, may be provided between the channel web and shaft to facilitate positioning of the channel member on the shaft. The stop pin 16' is here shown to have two cotter pins 18 and 18', one distant from the head and the other near the head. However, either of both of these cotter pins may be used. The cotter pin 18' near the head is adjacent to the inner face of one of the flanges 12' where it is more or less protected against abrasion. The tool 11 and spring plate 22 are preferably separate members, as shown, but, if desired, these members may be joined at their knuckled ends, as by welding. The construction of the rotary tiller of Figs. 4 and 5 is otherwise similar to that of Figs. 1 to 3, and the operation is the same.

The modified form of rotary tiller shown in Figs. 6 to 9 is similar to that of Fig. 1, except that an additional tool is provided and each tool 11 is held in place by a resilient retainer or keeper spring 34 interposed between the tool and the stop pin 16. The resilient retainer consists of a length of metal strap somewhat thinner than the tool and folded on itself to a U-shaped configuration, the free position thereof being shown in Fig. 9. One leg of the retainer is approximately flat and adapted to bear against the tool, and the other leg is longer than the first leg and is adapted to bear against the stop pin. The long leg of the retainer has an outwardly projecting lip 35 at its free end and a transverse rounded corrugation or groove 36 spaced from this end and presenting a seat for the stop pin 16.

When the tool 11 and spring plate 22 are to be installed, their knuckled ends are inserted under the pivot pin 15, the stop pin 16 being absent during this manipulation. The stop pin is then inserted and is held in place by the cotter pin 18. The lipped free end 35 of the retainer 34 is then inserted under the stop pin, as indicated by broken lines in Fig. 6, and the retainer is pushed or driven inwardly along the tool to the compressed position shown by full lines, the stop pin seating in the groove 36 and preventing loss of the retainer. The insertion of the resilient retainer urges the tool against the spring plate 22 and takes up all looseness between the parts. The several tools and spring plates are only slightly flexed or pre-loaded and practically all of their permissible elastic deflection is available during the use of the tiller. Each resilient retainer will accommodate variations in the distance between the tool and the associated stop pin, and forms a cushion resisting forward displacement of the tool. When it is desired to change or replace the tools, the retainers are forced outwardly along the tools to release the retainers from the stop pins. The operation of the tiller of Fig. 6 is similar to that of Fig. 1.

The modified form of rotary tiller shown in Fig. 10 is similar to that of Fig. 6 except that the spring plates 22 of Fig. 6 are omitted. As in the device of Fig. 6, the resilient retainer 34 holds the tool 11 in position on the rotary shaft 10. The operation of the tiller of Fig. 10 is the same as that of Fig. 6, except that for a given size of tool the effective range of tool deflection is somewhat smaller and consequently the load capacity is reduced.

Certain embodiments of the invention have been shown and described, but it will be obvious to those skilled in the art that modifications may be made without departing from the spirit and scope of the invention.

What I claim as new and desire to secure by Letters Patent is:

1. In a rotary tiller, the combination of a rotatable shaft, abutment members carried by said shaft in circumferentially spaced relation and spaced outwardly from the periphery of the shaft, and a tool member projecting outwardly from said shaft and interposed between the periphery of said shaft and said abutment members, said tool member having a resilient part bearing at an intermediate point on said shaft and held under flexural stress by said abutment members to impose an outward spring pressure against said abutment members, one of said abutment members forming a pivot against which an end portion of said tool member presses outwardly under the spring pressure of said resilient part.

2. In a rotary tiller, the combination of a rotatable shaft, abutment members carried by said shaft in circumferentially spaced relation and spaced outwardly from the periphery of the shaft, a tool member projecting outwardly from said shaft and interposed between the periphery of said shaft and said abutment members, and a resilient bar interposed between said shaft and tool member for urging said tool member outwardly against said abutment members, the intermediate portion of said resilient bar pressing on said shaft and the opposite end portions of said bar pressing on said tool member, and said bar being held under flexural stress by said abutment members.

3. In a rotary tiller, the combination of a rotatable shaft, abutment members carried by said shaft in circumferentially spaced relation and spaced outwardly from the periphery of the shaft, a tool member projecting outwardly from said shaft and interposed between the periphery of said shaft and said abutment members, and a resilient bar interposed between said shaft and tool member for urging said tool member outwardly against said abutment members, said resilient bar being engageable at its end portions with said tool member and being spaced from said tool member in the region between said abutment members.

4. In a rotary tiller, the combination of a rotatable shaft, abutment members carried by said shaft in circumferentially spaced relation and spaced outwardly from the periphery of the shaft, a tool member projecting outwardly from said shaft and interposed between the periphery of said shaft and said abutment members, said tool member having a knuckled end portion engageable with one of said abutment members to resist longitudinal shifting of said tool member, and a resilient bar interposed between said shaft and said tool member for urging said tool member outwardly against said abutment members, said resilient bar having a knuckled end portion interengageable with the knuckled end portion of said tool member to resist longitudinal shifting of said bar.

5. In a rotary tiller, the combination of a rotatable shaft having spaced abutments, a tool member projecting outwardly from said shaft and bearing against said abutments, said tool member having a retaining portion engageable with one of said abutments to resist longitudinal shifting of said tool member, and a resilient member for urging said tool member against said abutments and for yieldably resisting deflection of said tool member under working pressure, said resilient member having its opposite end portions bearing against said tool member and having an intermediate portion bearing against said shaft.

6. In a rotary tiller, the combination of a rotatable shaft having spaced abutments, a tool member projecting outwardly from said shaft and bearing against said abutments, said tool member having a knuckled portion engageable with one of said abutments to resist longitudinal shifting of said tool member with respect to said shaft, and a resilient bar interposed between said shaft and tool member for urging said tool member against said abutments and for yieldably resisting deflection of said tool member under working pressure, said resilient member having its opposite end portions bearing against said tool member and having an intermediate portion bearing against said shaft, one of the end portions of said resilient member being knuckled to interengage with the knuckled end portion of said tool member.

7. In a rotary tiller, the combination of a rotatable shaft, and a tool member projecting outwardly from said shaft and resiliently mounted thereon to permit rearward deflection of the tool member under working pressure, said shaft having spaced abutments against which said tool member bears at longitudinally spaced points under spring pressure, and said tool member having an open knuckled end portion pivotally engageable at its concave side with one of said abutment members to resist longitudinal shifting of said tool member, said knuckled end portion of the tool member being spring-urged outwardly against said last-named abutment.

8. In a rotary tiller, the combination of a rotatable shaft having axially spaced outwardly projecting parts, abutment pins carried by said parts in circumferentially spaced relation with respect to said shaft and spaced outwardly from the periphery of the shaft, and a tool member projecting outwardly from said shaft and interposed between said shaft and said pins, said tool member having a resilient part acting on said shaft to urge said tool member outwardly against said pins, one of said pins forming a pivot against which said tool member presses outwardly under spring pressure and the other of said pins being detachably mounted to permit said tool member to be deflected to an initially stressed position, the pivoted end of said tool member having an outwardly facing open bearing groove in which the pivot pin is seated, and being held in bearing engagement with the said pin by the spring pressure.

9. In a rotary tiller, the combination of a rotatable shaft, a channel member having its web secured to said shaft and having spaced outwardly projecting flanges extending transversely of the shaft axis, cross members carried by said flanges and spaced longitudinally of said channel member, and a tool member interposed between said channel web and said cross members and projecting outwardly from said shaft, said tool member bearing against said cross members and having a retaining portion engageable with one of said cross members to resist longitudinal shifting of said tool, and said tool member having a resilient part acting on said shaft to urge said tool member outwardly against said cross members.

10. In a rotary tiller, the combination of a rotatable shaft, a channel member having its web secured to said shaft and having spaced outwardly projecting flanges extending transversely of the shaft axis, cross members carried by said flanges and spaced longitudinally of said channel member, a tool member interposed between said channel web and said cross members and projecting outwardly from said shaft, said tool member bearing against said cross members and having a retaining portion engageable with one of said cross members to resist longitudinal shifting of said tool member, and resilient means interposed between said channel web and tool member for urging said tool member outwardly against said cross members.

11. In a rotary tiller, the combination of a rotatable shaft, an abutment member carried by said shaft, a tool member projecting outwardly from said shaft and resiliently mounted thereon, said tool member being deflectable rearwardly away from said abutment member under working pressure, and a resilient compressible retainer interposed between said members and having a detent portion engageable with one of said members.

12. In a rotary tiller, the combination of a rotatable shaft, an abutment member carried by said shaft, a tool member projecting outwardly from said shaft and resiliently mounted thereon, said tool member being deflectable rearwardly away from said abutment member under working pressure, and a forked compressible retainer spring interposed between said members, one leg of said spring having a recessed detent portion engaging said abutment member.

13. In a rotary tiller, the combination of a rotatable shaft, an abutment member carried by said shaft, a tool member projecting outwardly from said shaft and resiliently mounted thereon, said tool member being deflectable rearwardly away from said abutment member under working pressure, and a forked compressible retainer spring interposed between said members, one leg of said spring having a recessed detent portion engaging said abutment member, and the free end of said leg projecting beyond the other leg and adapted to engage with said abutment member to facilitate pressure insertion of said spring between said members.

HARRY J. SEAMAN.